455-601 AU 233 EX CROSS REFERENCE EXAMINE

FIP8106 XR 3,438,586

FREQUENCY MODULATED LIGHT COUPLED DATA LINK

Filed June 2, 1965 4 Sheets-Sheet 1

Inventors:
Donald L. Watrous,
John D. Harnden, Jr.
by Charles W. Helzer
Their Attorney.

Inventors:
Donald L. Watrous,
John D. Harnden, Jr.
by Charles W. Helzer
Their Attorney.

FREQUENCY MODULATED LIGHT COUPLED DATA LINK

Filed June 2, 1965 4 Sheets-Sheet 3

Inventors:
Donald L. Watrous,
John D. Harnden, Jr.
by Charles W. Helzer
Their Attorney.

Jan. 6, 1970 D. L. WATROUS ETAL 3,488,586

FREQUENCY MODULATED LIGHT COUPLED DATA LINK

Filed June 2, 1965 4 Sheets-Sheet 4

Inventors:
Donald L. Watrous,
John D. Harnden, Jr.
by Charles W. Helzer
Their Attorney.

United States Patent Office 3,488,586

Patented Jan. 6, 1970

3,488,586

FREQUENCY MODULATED LIGHT COUPLED DATA LINK

Donald L. Watrous, Scotia, and John D. Harnden, Jr., Schenectady, N.Y., assignors to General Electric Company, a corporation of New York Filed June 2, 1965, Ser. No. 461,231

Int. Cl. G01r *31/00;* H04b *9/00;* H01j *39/12*

U.S. Cl. 324—96 10 Claims

ABSTRACT OF THE DISCLOSURE

A wide range remote control data link comprises a light coupled transmitter-receiver using a semiconductor light emitting diode in the transmitter to emit light pulses at a variable frequency rate corresponding to a D-C analog control signal such as current in an EHV line or an audio modulated signal. The receiver includes a solid state electro-optical sensor and circuitry for reconverting the received light pulses to an analog output. The electro-optical devices can be coupled by fiber optics and several control units can operate at different light frequencies.

This invention relates to a new and improved frequency modulated wide range remote control system data link using pulsed light coupling.

More particularly, the invention relates to a new and improved fast responding relatively inexpensive optically coupled wide range remote control system data link for analog information having low average power consumption requirements and capable of deriving at a remote location a reliable indication of the value of a phenomenon being examined for measurement or control purposes.

In the electrical control industry, there are large number of measurement and/or control situations requiring the sensing of a phenomenon at one location, and the actuation of measurement and/or control equipment remotely located from the spot where the phenomenon is being sensed. One example of such a situation occurs in the transmission of electric power at extra high voltages (EHV). Because of the extra high voltage environment, it is desirable to sense current flow in an EHV line and to transcribe the sensed current value to equipment located on the ground for measurement and/or control purposes. Similar problems arise in a number of different application areas where, because of personnel hazard, inaccessibility, etc., it is desirable to reliable transcribe information sensed in one locale to remotely located equipment.

It is therefore a primary object of the present invention to provide a new and improved wide range remote control system data link using pulsed light coupling.

A feature of the invention is the provision of an optically coupled wide range data link employing varying repetition rate light pulses for optical coupling, and which is fast responding, reliable in operation, relatively inexpensive to manufacture, and requires only low average power consumption in operation.

In practicing the invention, a new and improved wide range remote control data link is provided which includes a control signal developing means for deriving an analog variable magnitude direct current electric control signal indicative of a phenomenon to be measured or controlled. A light transmitter is controlled by the control signal developing means and comprises an analog to frequency conversion means coupled to the control signal developing means for deriving a variable repetition rate pulsed electric signal whose variations in repetition rate correspond to the magnitude variations of the analog control signal. A light emitting semiconductor device is operatively coupled to the analog-to-frequency conversion means for deriving a series of light pulses whose repetition rate corresponds with the repetition rate of the electric signal developed by the analog-to-frequency conversion means. The transmitter is optically coupled to a receiver which comprises an electro-optical receiver device operatively coupled to the light emitting semiconductor device for re-converting the varying repetition rate light pulses to a varying repetition rate electric signal, and means are coupled to the electro-optical receiver device for deriving an indication of the phenomenon being examined from the varying repetition rate electric signal thus derived. In a preferred embodiment of the invention, the electro-optical receiver device comprises a light activated semiconductor device, and the light emitting semiconductor device comprises a non-coherent light emitting diode operated at normal room temperatures.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figures 1, 2, 3:
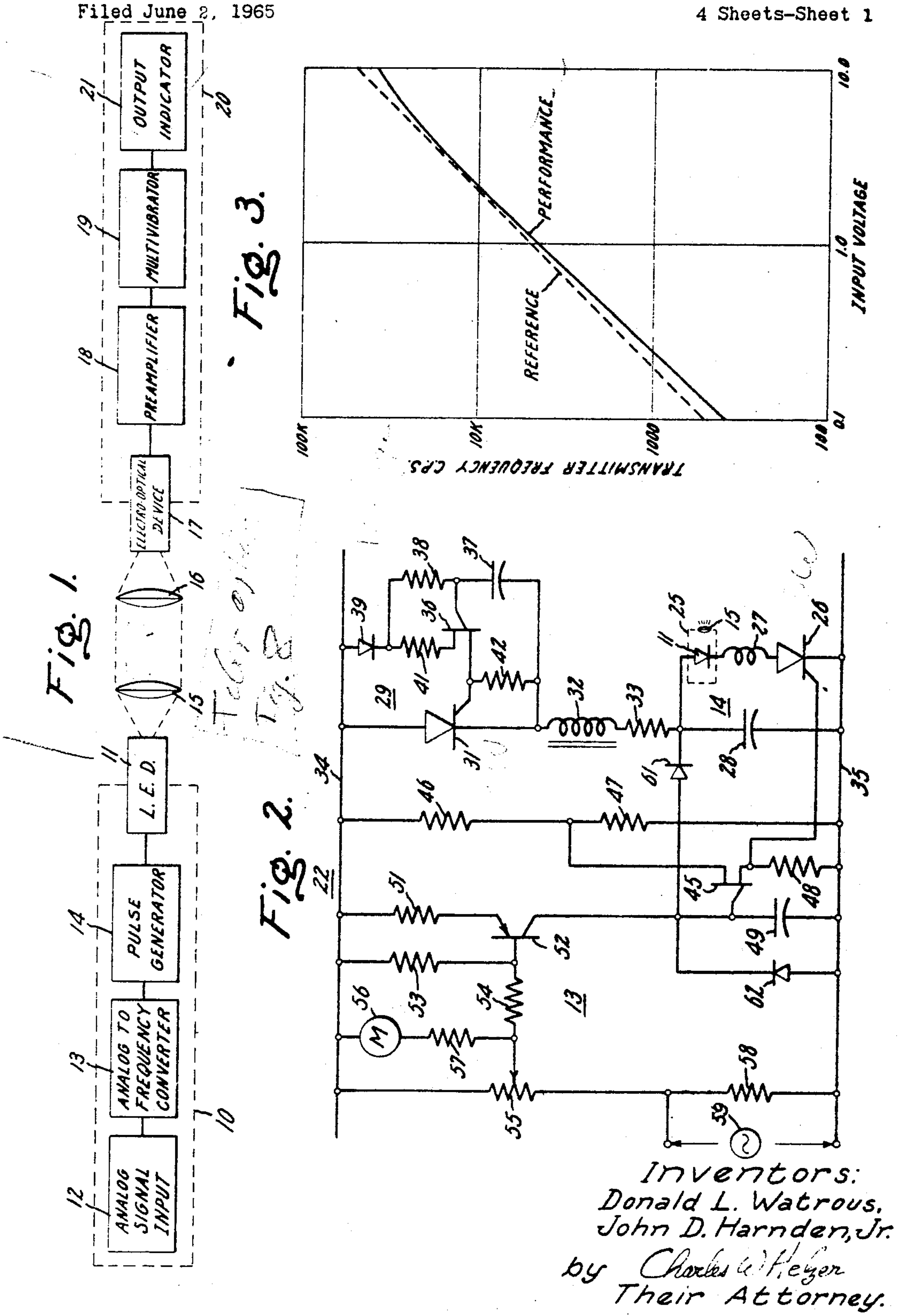
FIGURE 1 is a functional block diagram of a new and improved wide range remote control data link using pulsed optical coupling and constructed in accordance with the present invention.
FIGURE 2 is a detailed schematic circuit diagram of the transmitter portion of the new and improved data link shown in FIGURE 1.
FIGURE 3 is a part of the input control voltage versus output frequency characteristic of the transmitter shown in FIGURE 2 of the drawings.

The light emitting diode, sometimes referred to as an injection luminescence diode, is a light emitting semiconductor which only recently has been introduced into the electrical industry for use as a new control circuit tool. This device is based on an effect first observed by Lossev in 1923, and is capable of producing both coherent and noncoherent light emission. The light emitting diode of primary interest in this application operates at normal room temperatures (in the neighborhood of 25° C.) and emits noncoherent light. The device is stimulated by a direct current electrical signal rather than optically by external light, it can be easily modulated by an applied control signal voltage, it should prove to be relatively inexpensive as its use becomes more wide spread, and it can be readily miniaturized and ruggedized for both military and industrial applications. Most of the presently available commercial light emitting diodes are fabricated from gallium arsenide or crystals of gallium arsenide and gallium phosphide. The gallium arsenide devices will emit light in the near infrared region at 8400 angstrom if operated at a temperature of about 77° Kelvin, and will emit light at 9000 angstrom if operated at normal room temperatures. The gallium arsenide-gallium phosphide devices emit visible light in the red-orange region near 7200 angstrom if operated at a case temperature of 77° Kelvin, and at 7700 angstrom operated at a case temperature of 25° C. For a more detailed discussion of the characteristics of light emitting pn junction diodes, reference is made to certain of the semiconductor specification sheets published by manufacturers of these devices such as the Semiconductor Products Department of the General Electric Company located at Electronics Park, Syracuse, N.Y. See, for example, the General Electric—Semiconductor Specification Sheet No. 55.10, issued August 1963, entitled Light Emitting PN Junction Diodes LED 1–LED 4; the Specification Sheet identified as LED–5—Infrared Light Emitting Diode, and the Specification Sheet No. 55.13 issued October 1964, entitled LED–9, LED–10, LED–11—Infrared Light Emitting Diodes. These represent only a few of the present commercially available light emitting diodes suitable for use in the wide range control system data link circuit to be described hereinafter; however, the application is in no way restricted to use with the devices listed above. For a list of other potentially useful LED devices, reference is made to an article entitled "Semiconductors for Illumination," appearing in the June 1965 issue of Radio-Electronics Magazine. It should be noted also that the performance of the light emitting diode may be enhanced by operation at very cold temperatures (in the region of 77° Kelvin); however, in the present circuits, it is anticipated that these devices will be operated at normal room temperatures in the neighborhood of 25° C. since this represents the most practical mode of operation for most control systems.

From a consideration of the above description, it can be appreciated that the light emitting diode (LED) constitutes a reliable light signal source which is capable of the high speeds of response required for both measurement and control purposes. The LED is capable of being incorporated in circuits providing isolation, good linearity, and good dynamic performance. Since they require only a few volts and amps for excitation, they can be used with battery sources of supply, as well as with other low-average power level sources.

Another characteristic of the light emitting diode which is of interest is its capability of directly transmitting analog information. By this is meant the capability of the light emitting diode to emit radiation the intensity of which is proportional to the direct current excitation current supplied to the LED. Thus, by measuring the magnitude or intensity of the emitted radiation, the value of the DC excitation current applied to the LED can be determined. A very serious limitation of any data transmission system employing the analog capabilities of the LED, however, would be the calibration dependence of the system upon the light generation and transmission, efficiency. Any dirt, mis-alignment of the optical path, etc., could greatly affect the system calibration, and therefore affect adversely its reliability.

In order to overcome the limitations associated with the analog data transmission system, the pulsed light optically coupled transmission system employed in the present invention was devised.

FIGURE 1 of the drawings is a functional block diagram of a new and improved wide range remote control system data link using modulated light pulses for coupling to effect high fidelity transmission of remotely sensed information to a conveniently located light optic receiver. The system shown in FIGURE 1 is comprised by a light transmitter 10 which includes a light emitting diode 11, an analog signal generating device 12, an analog-to-frequency converter 13, and a pulse generator 14. The analog signal generating device 12 may comprise any form of remotely located signal sensing device capable of deriving an analog variable magnitude direct current electric control signal indicative of a phenomenon to be measured or controlled. The nature of the analog signal generating device 12 will be discussed more fully hereinafter in connection with FIGURE 6 of the drawings. The analog control signal developed by the analog signal generating device 12 is applied to an analog-to-frequency converting means 13 which serves to convert the analog control signal to a pulsed or digital varying repetition rate electric signal whose repetition rate variations correspond to the magnitude variations of the analog control signal. The varying repetition rate pulsed electric signal derived by the analog-to-frequency converter 13 is then applied to pulse generator circuit means 14 whose output directly excites the light emitting diode 11. As a consequence of this arrangement, the light emitting diode 11 will derive a series of light pulses whose repetition rate corresponds to the repetition rate of the pulsed electric signal derived by the analog-to-frequency converter, and hence to the magnitude variations of the analog control signal.

The varying repetition rate light pulses produced by the light emitting diode 11 are optically coupled through a suitable light path to a light receiver 20 remotely located from transmitter 10. As shown in FIGURE 1, the suitable light path may be formed by a lens system comprised by the two lens 15 and 16 that optically couple LED 11 to an electro-optical receiving device 17 in receiver 20. The electro-optical receiving device 17 serves to reconvert the varying repetition rate light pulses to a varying repetition rate pulsed electric signal. This varying repetition rate pulsed electric signal is then supplied through a suitable preamplifier 18 and monostable multivibrator 19 to an appropriate output indicating means 21 that serves to provide an output indication of the phenomenon being examined. For some purposes, the output indicator may employ the pulsed digital form output signal directly for application to a meter, or for use as a control signal in the actuation of other electrically operated apparatus such as switchgear, and the like. For some purposes, however, it is desirable that the output indicating means 21 provide some form of integrating function to the output signal developed by the monostable multivibrator 19. As a consequence of this integrating action, the form of the original analog variable magnitude direct current electric control signal is retrieved.

From a consideration of the above brief description of the new and improved wide range remote control system data link using pulse repetition rate modulated light coupling, it can be appreciated that the system basically comprises a pulse modulated light transmitter shown in a dotted outline box 10, a suitable light optical coupling path formed by an appropriate lens system 15, 16, and a pulse modulated light receiver shown in the dotted outline box 20. It should be noted that while the light optical path is illustrated as being in its simplest form a light transmission path through the atmosphere enhanced by a appropriate lens system, it is also possible to employ a closed light coupling path in the form of a fiber optic rod, or a bundle of such rods or a hollow light reflecting insulating bushing. Any of these arrangements would provide a closed light coupling path between the pulse modulated light transmitter and the light receiver. The provision of such a means would still provide good electrical insulation between the transmitter and the receiver, but at the same time would avoid any possible impairment of the light transmission path due to dirt, weather, birds or the like which might otherwise affect the efficiency of the light transmission coupling between the transmitter and the receiver.

The circuit details of construction of the transmitter 10 are shown in FIGURE 2 of the drawings. As illustrated in FIGURE 2, the transmitter is comprised by the light emitting diode 11 which preferably is mounted in an adjustable focus type light source holder, indicated by the dotted line box 25, which includes a lens 15 for collimating the light emitted by the light emitting diode 11 into a suitably focused beam of light. This adjustable focus type of light source holder may be one of the standard commercially available products of this type such as are marketed by the Farmer Electric Products Company, Inc. of Natick, Mass., for example. The light emitting diode 11 is energized by pulse generator circuit 14 which is comprised essentially by a gate controlled SCR 26 connected in series circuit relationship with an inductor 27 and light emitting diode 11 across a pulsing capacitor 28. The silicon controlled rectifier (SCR) is a well known thyristor device with a pnpn semiconductor structure. In operation, upon the SCR 26 being gated on, the charge built up on the pulsing capacitor 28 is discharged through the inductor 27 and light emitting diode 11 thereby producing a pulse of light from the light emitting diode 11. The frequency at which the SCR 26 is gated on then of course determines the repetition rate of the light pulses produced by the light emitting diode 11.

In order to recharge the pulsing capacitor 28 following each period of conduction of the SCR 26, the pulsing capacitor 28 is operatively coupled to a recharging circuit means 29. The recharging circuit means 29 includes a second gate controlled SCR 31 connected in series circuit relationship with an inductor 32, a limiting resistor 33, and the pulsing capacitor 28 across the terminals 34 and 35 of a direct current power source not shown. In the circuit configuration of FIGURE 2, the power supply terminal 34 is assumed to be positive with respect to the terminal 35. The second gate controlled SCR 31 has its control gate operatively connected to a timing circuit comprised by a unijunction transistor 36. The unijunction transistor 36 has its emitter electrode connected to the junction of a resistance-capacitance charging network comprised by a second capacitor 37 and a resistor 38 connected in series circuit relationship with a blocking diode 39 across the load terminals of the second SCR 31. One of the base electrodes of the unijunction transistor 36 is connected through a limiting resistor 41 to the junction of the diode 39 and resistor 38. The remaining base electrode of unijunction transistor 36 is connected directly to the control gate of the second SCR 31 and to a bias resistor 42 connected between the control gate and emitter electrodes of the second SCR 31.

In order to control the frequency at which the first gate controlled SCR 26 is turned on, its control gate is connected back to the output of the analog-to-frequency converter 13 which comprises essentially a driven relaxation oscillator. This oscillator is formed by a unijunction transistor 45 having one of its base electrodes connected to the juncture of a resistor voltage divider comprised by resistors 46 and 47 connected in series across the power supply terminals 34, 35. The remaining base electrode of unijunction transistor 45 is connected through a bias resistor 48 to the negative power supply terminal 35 and also is connected directly to the control gate of the first SCR 26. The emitter electrode of unijunction transistor 45 is connected to the juncture of a variable voltage resistance-capacitance charging network formed by a capacitor 49, a resistor 51, and a constant current pnp transistor 52 connected in series circuit relationship across the power supply terminals 34 and 35. The base electrode of the constant current transistor 52 is connected to the juncture of a pair of voltage dividing resistors 53 and 54 that in turn are connected to the variable tap of a variable resistor 55. A volt meter 56 and a limiting resistor 57 are connected in series circuit relationship across the variable resistor 55 to provide a visual display of the input voltage applied to the constant current transistor 52.

The variable resistor 55 itself may constitute the source of analog variable magnitude direct current control signal applied to the transmitter. For example, the variable resistor 55 could comprise a temperature sensitive thermistor for deriving an analog control signal representative of temperature conditions of a given locality. Alternatively, the variable resistor 55 can be connected in series circuit relationship with a second resistor 58 with the series circuit thus comprised being connected across the power supply terminals 34 and 35. A modulating signal source indicated at 59 may then be connected across the resistor 58 for modulating the intelligence signal to be transmitted onto a carrier frequency determined by the setting of the variable resistor 55. With either mode of operation, it can be appreciated that the analog control signal applied to the base of the constant current transistor 52 determines the build-up of potential on the capacitor 49 which in turn controls the frequency at which the unijunction transistor oscillator 45 operates. This in turn then will control the frequency of turn-on of the first SCR 26. It might also be noted that while one specific form of analog-to-frequency converter has been disclosed for use in the invention, other forms of such converters could be used in its place with equal facility. There are a number of commercially available analog-to-frequency converter circuits which could be readily incorporated in the present data link. The Magaverter manufactured and sold by Pioneer Magnetics, Inc., of Santa Monica, Calif., and the Data Technology Corporation's DT 1401-Voltage to Frequency Converter (Palo Alto, Calif.) are examples of such commercially available circuits.

Having described the construction of the pulse repetition rate modulated light transmitter shown in FIGURE 2, its operation is as follows. Assume that the pulsing capacitor 28 is initially charged to a positive voltage larger than that of the supply voltage applied to terminals 34 and 35. Then, upon the first SCR 26 being gated on, capacitor 28 is discharged through inductor 27 and the light emitting diode 11. This discharge will be in the form of a half sinusoidal current pulse which is under damped so that a negative voltage is developed across the pulsing capacitor 28 that is limited by the two voltage limiting diodes 61 and 62. The presence of this negative voltage will insure that the first SCR 26 will be commutated off following the half sinusoidal current pulse. The pulse width and amplitude of the half sinusoidal current pulse is controlled by adjusting the values of the inductor 27 and the pulsing capacitor 28.

During the non-conducting intervals of the first SCR 26, the second SCR 31 and blocking diode 39 are reverse biased by the positive potential on pulsing capacitor 28. Upon capacitor 28 being discharged, the second SCR 31 will then serve to block the supply voltage. This results in energizing the timing unijunction transistor oscillator comprised by unijunction transistor 36 so that it begins to time. After a predetermined time dependent upon the time constant of capacitor 37 and resistor 38, a gating pulse will be applied to the control gate of the SCR 31. Upon second SCR 31 being gated on, the pulsing capacitor 28 will be resonantly charged to above the supply voltage through the inductor 32. The resistor 33 serves to dampen the resonant charge applied to capacitor 28. At the end of the charging interval, the second SCR 31 will be reverse biased so that it will then be commutated off. It should be noted that the delay in the firing of the second SCR 31 provided by the timing unijunction transistor oscillator 36 provides sufficient time for the first SCR 26 to completely recover its blocking capability. Depending upon the devices used in fabricating the circuit, a complete cycle of the pulse generator may require as much as 20 microseconds thereby allowing the frequency of operation of the transmitter to range from about 50 cycles per second to 50,000 cycles per second. However, by the use of currently available faster responding devices, a complete cycle of operation can be reduced to the order of 15 nanoseconds allowing operation from steady state D.C. (zero cycles per second) all the way up to the megacycle range if transistors are employed. As a matter of interest, it should be noted that insofar as frequency of operation is concerned, theoretically the light emitting diode can be operated all the way up to the gigocycle range ($10^{12}$ cycles/sec.). However, other devices and elements employed in the circuit, as well as the circuit configuration as presently disclosed, do practically limit the frequency of operation below the theoretical value. By substitution of faster responding transistors for SCR's, etc., the frequency of operation can be considerably extended to operation within the range indicated above.

As stated previously, the frequency of turn-on of the first SCR 26 is controlled by the unijunction transistor oscillator 45 comprising the analog to frequency converter circuit 13. To enhance operation of this circuit, the negative voltage across the pulsing capacitor 28 is coupled back through diode 61 to the emitter of the unijunction transistor 45 to commutate it off at the end of each pulse. FIGURE 3 of the drawings illustrates a plot of the transmitter frequency output versus the input voltage as measured by the meter 56. As can be determired from a comparison of the actual transmitter output to an idealized reference curve shown in dotted line form in FIGURE 3, the output frequency of the transmitter increases with an increasing direct current control signal in an extremely linear fashion. In wide range systems, transistor 52 which is used for an adjustable constant current source should be a silicon device, and in addition should include temperature compensation and feedback to achieve optimum characteristics. While in the arrangement of FIGURE 2, the variable magnitude analog direct current control signal was derived across the variable resistor 55, as will be described more fully in connection with FIGURE 6, this signal can be derived from other sensing arrangements.

If desired, audio information can be transmitted by frequency modulating the base carrier frequency determined by the setting of the adjustable resistor 55. The presence of an alternating current modulation signal applied from the source 59 acros resistor 58 will cause the transmitter frequency to deviate about the carrier frequency at an audio rate.

The most important element of the pulse repetition rate modulated light receiver employed in the wide range control system data link, is the electro-optical device 17 used to convert the varying repetition rate light pulses to a varying repetition rate pulsed or digital electric signal. There are many different types of electro-optical devices which can be used for this purpose, depending primarily upon the environmental circumstances and location of the receiver. For example, it would be possible to use a light activated semiconductor device as the light receiving element 17 such as a germanium phototransistor, a silicon phototransistor, a germanium photo-diode, or a silicon photo-diode all of which devices can be employed satisfactorily, and are commercially available on the open market from a number of established semiconductor manufactures. It is also possible to employ a conventional photomultiplier device as the electro-optical conversion element, as well as other forms of wide area receptors, such as any of the well known photoconductors lead sulfide, cadmium sulfide, or cadmium selenide as the electro-optical receiver device where the response characteristics of these devices are adequate. By the use of a wide area receptor such as these, the problem of focusing the light beam to a small and accurately oriented spot can be somewhat relieved. In addition to the above devices, it would be possible to employ a light activated SCR as the electro-optic element of the receiver. The light activated SCR is a device which recently has been made commercially available by the Semiconductor Products Department of the General Electric Co., and described more fully in its Application Note No. 200.34, issued January 1965.

Figure 4:
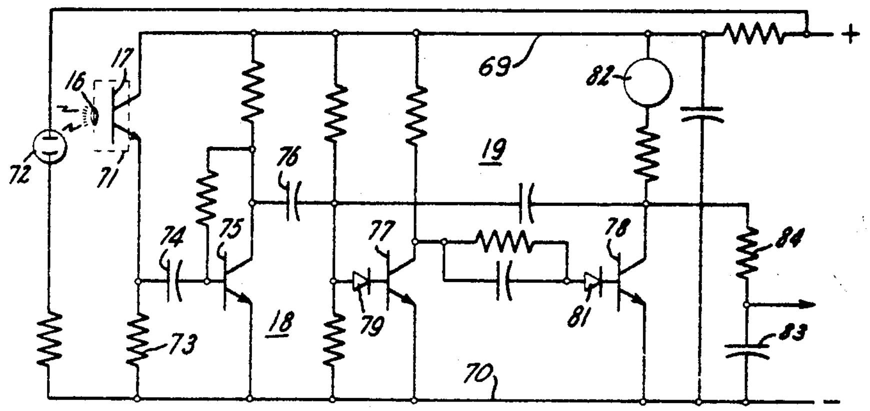
FIGURE 4 is a detailed circuit diagram of the receiver portion of the wide range data link shown in FIGURE 1.

The circuit details of construction of a preferred form of pulse modulated light receiver suitable for use in the new and improved wide range control system data link is illustrated in FIGURE 4. In the receiver circuit of FIGURE 4, a planar silicon phototransistor is shown at 17 as being the electro-optical device used to convert the varying repetition rate light pulses to a varying repetition rate pulsed electric signal. This planar silicon phototransistor may be of the type identified as type LS-400 NPN planar silicon photo device marketed by the Texas Instrument Company of Dallas, Tex. The silicon phototransistor 17 is physically supported within a suitable adjustable focus light source holder 71 similar to that employed for the light emitting diode of the transmitter, and includes a lens 16 for collimating and focusing light from the light emitting diode onto the light sensitive junction of the phototransistor 17. With an arrangement of this nature, the silicon phototransistor 17 has a time constant of about 15 microseconds and when receiving a light pulse of about 8/10 of a microsecond duration, its electrical response is down to about 5% of its maximum value. Further, at very low light levels the sensitivity of the silicon phototransistor 17 may be down even further, and for this reason, the device is biased to about 10 microamperes of current by a bias light source 72 physically arranged adjacent the phototransistor in a manner to direct a bias light beam through the lens 16 onto the device 17. With this arrangement, the sensitivity of the phototransistor 17 to low intensity light pulses is greatly enhanced.

The varying frequency pulsed electric signals produced by the varying repetition rate light pulses impinging on phototransistor 17 are derived across a load resistor 73 connected in series circuit relationship with the phototransistor 17 across a pair of direct current power supply terminals 69 and 70. This varying repetition rate pulsed electric signal is coupled through a coupling capacitor 74 to the base electrode of a npn junction transistor 75 which comprises a part of the preamplifier 18. The preamplifier 18 serves to amplify this pulsed electric signal and to couple the same through a coupling capacitor 76 to a monostable multivibrator comprised by a pair of npn junction transistors 77 and 78. The monostable multivibrator 77 and 78 is of conventional construction with the possible exception of the inclusion of the diodes 79 and 81 which are employed to remove the reverse base-emitter voltage of the transistors 77 and 78 during operation of the monostable multivibrator thereby improving its frequency response characteristics.

The monostable multivibrator 77, 78 serves to generate one output pulse of a fixed time duration and amplitude for each of the detected light pulses received by the phototransistor 17. These pulses are then averaged by a meter 82 connected across the output of the monostable multivibrator to provide a visual indication of the value of the control signal being transcribed. In addition, an analog variable magnitude direct current electrical control signal can be obtained across the output of a filter capacitor 83 that is connected through a resistor 84 across the output of the monostable multivibrator. This analog variable magnitude direct current electric control signal will then constitute a replica of the original analog control signal developed by the sensor that is driving the pulse modulated light transmitter. The time constant of the filter comprised by capacitor 83 and resistor 84 can be chosen to transmit any desired portion of the frequency band to which the circuit is capable of responding. In the event that it is desired to use the data link for transmitting audio signals, then this filter can be designed to reject the carrier frequency upon which the audio signals are modulated, and to pass only the lower audio band. With such a system, very intelligible voice communications are possible. For other applications of the circuit such as those to be described hereinafter, considerably more filtering may be required in order to obtain the desired reproduction of the original analog DC control signal.

From a consideration of the above description, it can be appreciated that the multivibrator 19 and output indicator 21 together constitute a frequency-to-analog inverter for reconverting the pulsed light signals to the original analog variable magnitude direct current electric signal form. In place of these elements, it would be possible to employ appropriate ones of any of the commercially available frequency-to-analog converters sold on the open market. Such converters are marketed, for example, by the Foxboro Co., Van Nuys Division of Van Nuys, Calif., or the Solid State Electronics Company of Sepulveda, Calif., and could be readily incorporated into the circuit of FIGURE 4 without requiring too substantial redesign.

Figure 5:
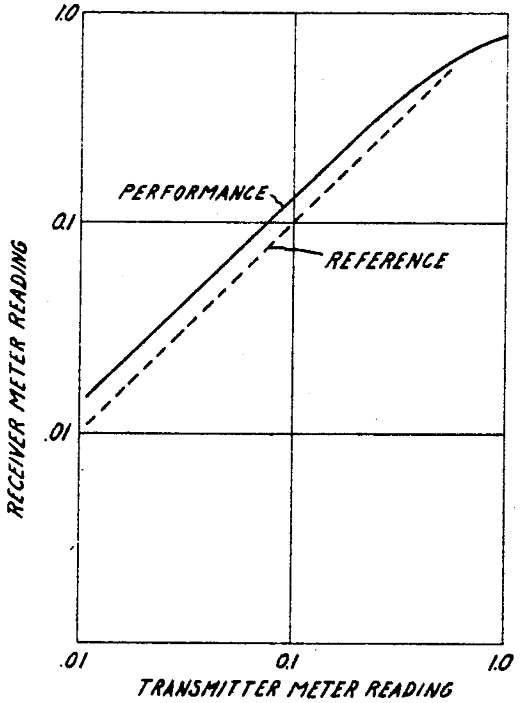
FIGURE 5 is a plot of the receiver output voltage versus transmitter input control voltage characteristic of the complete system.

With the wide band control system data link using frequency modulated light coupling described above and illustrated in FIGURES 1–4, it is possible to obtain a frequency response characteristic extending from a maximum frequency of about 50,000 cycles per second to a minimum frequency on the order of 100 cycles per second. The minimum frequency is determined generally by the leakage current of the constant current transistor 52 in the transmitter portion of the system. Using high quality silicon transistors for this element, it would be possible to extend the minimum frequency down to zero value; however, for reliable operation at the lower frequency end of the band it would be necessary to provide temperature compensation for the circuit as well. The curve shown in FIGURE 5 of the drawings is a plot of the reading of the receiver meter 82 versus the reading of the transmitter meter 56. An examination of this curve reveals the correspondence and linearity between the reading of the transmitter meter and the reading of the receiver meter in comparison to the dotted idealized reference line. The receiver meter reading is quite independent of the amplitude of the received light signal so long as the received light signal is sufficiently large to trigger the monostable multivibrator.

Figure 6A:
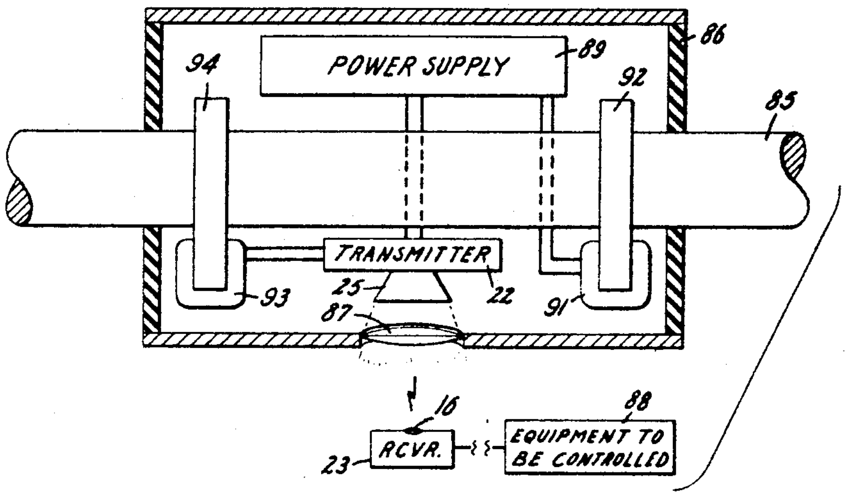
FIGURES 6A and 6B are partial schematic illustrations of one form of EHV current sensing arrangement using the new and improved wide range frequency modulated optically coupled data link to transmit the sensed current value in an extra high voltage power transmission line to remotely located ground equipment.
Figure 6B:
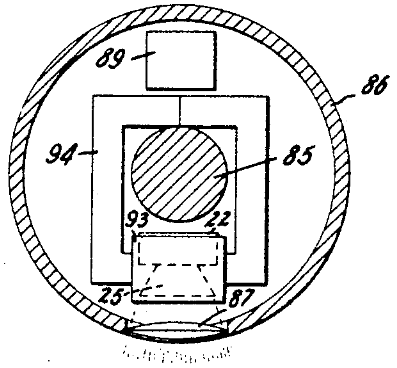

FIGURES 6A and 6B of the drawings illustrate one form of a suitable DC analog control signal sensing device for use with the wide range control system frequency modulated light coupled data link comprising the present invention. This analog control signal sensing device is designed for use primarily in connection with extra high voltage power transmission lines, depicted by the conductor 85. The EHV power conductor 85 passes through a suitable housing 86 having insulating end pieces on which the frequency modulated light transmitter 22 may be physically supported. Transmitter 22 is supported within housing 86 in a manner such that the adjustable focus light holder 25 is disposed over a suitable window or lens 87. Light pulses emitted from the LED of the transmitter are optically coupled through a suitable optical path to a light receiver 23 which normally would be located on the ground as described earlier, the transmitter may be optically coupled to the receiver through an appropriate lens system, a fibre optic rod, or a hollow insulating bushing having an internal reflecting surface. The output electric signal developed by the light receiver is then applied to a meter or other equipment to be controlled shown at 88.

The transmitter 22 receives its power from a battery power supply indicated at 89. The battery power supply 89 may comprise any conventional battery source of electric current whose charge is maintained by a suitable low-cost Zener diode power supply circuit for trickle charging the battery. The trickle charging circuit (not illustrated) may be of conventional construction and receives its power from a suitable supply current transformer 91 supported on a core 92 that surrounds the EHV power conductor 85. The core 92 may comprise two halves of a C-core, or be suitably hinged so that it can be hooked over the EHV power conductor 85 without requiring that the conductor be broken. It is fabricated in such a manner that it will normally be driven into saturation for any large current surges occurring in the conductor 85. In addition to the power supply current transformer 91, a second signal current transformer 93 is provided together with its saturable core 94 for sensing the value of the current flowing in the EHV power conductor 85. The second signal current transformer 93 may be smaller than the supply transformer 91 and has its output connected directly to the input terminals of the constant current transistor 52 in the transmitter circuit shown in FIGURE 2, in place of the variable resistor 55.

As a consequence of the above arrangement, variations in the current flowing in the EHV power conductor 85 will induce an analog variable magnitude control signal in the current transformer 93 that is applied to transmitter 22 to control the repetition rate of the light pulses produced by the transmitter. The varying repetition rate light pulses will then be transmitted through a suitable optical coupling path to the receiver 16 where they are again converted to an analog electric signal representative of the value of the current flowing in the conductor 85. This analog control signal may then be used to actuate a meter to provide an indication of the value of the current, or be used to control other switching apparatus in the system employed to control power flow through the conductor 85. It is assumed that the variations in the current through the conductor 85 are sufficient to provide the necessary trickle charge to the battery power supply 89. This feature of the arrangement allows the current monitor to be operated with zero line current in the conductor 85 for a limited period determined by the life of the battery. Additionally, the circuit is self-protecting in that for heavy surge currents occurring in the conductor 85, the current transformers used to trickle charge the power supply and for signal sensing will saturate and prevent any excess input current being applied to the trickle charging power supply circuit or the transmitter.

Figure 7A:
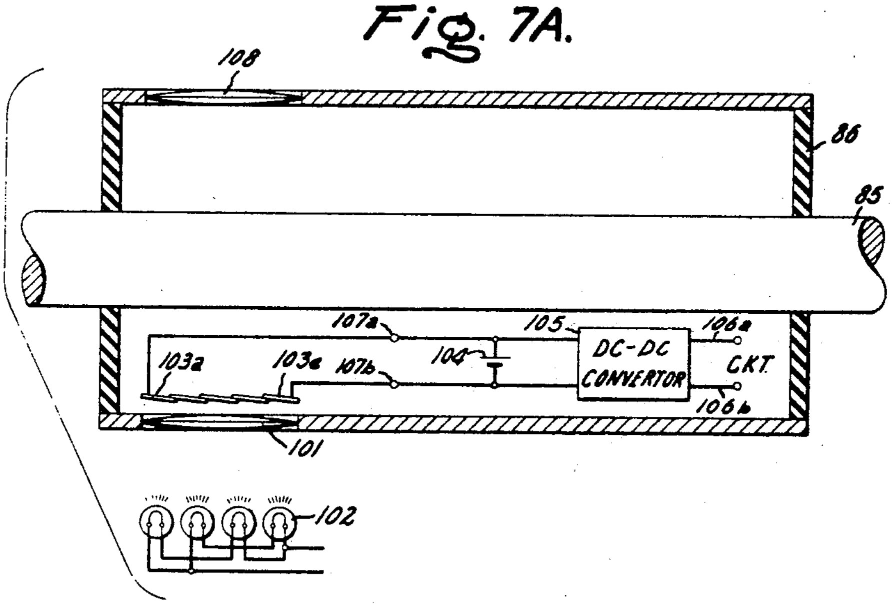
FIGURES 7A and 7B are partial schematic illustrations of an alternative solar cell power supply for use with the current monitor arrangement of FIGURES 6A and 6B.
Figure 7B:
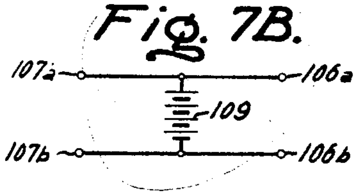

FIGURES 7A and 7B of the drawings illustrate alternative solar cell power supply schemes for use with the current monitor arrangement of FIGURES 6A and 6B of the drawings. As described above, the current monitor shown in FIGURES 6A and 6B utilizes a power supply source which requires an additional supply current transformer 91 for deriving power from the power supply conductor 85 to energize the transmitter 22. The power supply arrangement shown in FIGURES 7A and 7B of the drawings are intended for use in place of the power supply current transformer 91. As illustrated in FIGURE 7A, the alternative solar cell power supply arrangements require that an additional window 101 be formed in the housing 86 in which the pulse light modulated transmitter 22 is situated. However, for the convenience of illustration, the pulsed light transmitter 22 has not been shown. The window 101 is oriented so that light emitted from a bank of incandescent lamps 102 located on the ground, is directed through the window 101. Light rays passing through the window 101 impinge on a plurality of semiconductor solar cells $\mathbf{103_a}$ through $\mathbf{103_e}$ connected in series circuit relationship and arrayed over the window 101. The solar cells $\mathbf{103_a}$ through $\mathbf{103_e}$ may all comprise semiconductor junction solar cells of the type described, for example, in a paper by D. M. Chapin, C. S. Fuller, and G. L. Pearson, entitled "A New Silicon P-N Junction Photo Cell for Converting Solar Radiation Into Electrical Power," appearing in the Journal of Applied Physics, volume 25, pages 676 and 677, May 1954 issue. The solar cell elements $\mathbf{103_a}$ through $\mathbf{103_e}$ are connected in series across a small single cell battery 104 that in turn has its output connected to a DC-DC converter 105. The DC-DC converter 105 is a conventional circuit for converting a direct current potential of one value to a direct current potential of a different value, and has its output connected through terminals $\mathbf{106_a}$ and $\mathbf{106_b}$ to the transmitter power supply 89 shown in FIGURE 6A of the drawings. If desired, an additional window 108 may be designed into the housing 86 in such a manner that illumination from the sun's rays can fall on the photo cell array $\mathbf{103_a}$ through $\mathbf{103_e}$. By this means the duty cycle of the bank of incandescent lamps 102 can be reduced at least on sunny days.

As an alternative to the single cell 104 and DC-DC converter 105, it would be possible to connect in place of these elements a single multiple cell battery 109 as shown in FIGURE 7B of the drawings. The battery 109 is made up of a plurality of cells, and is designed to have a voltage rating adequate to power the transmitter 89. By this means, it would be possible to provide enough standby battery power to perhaps operate the system over not too prolonged periods of low intensity illumination of the solar cell array from the sun, and thereby do away with the need for the ground energized bank of incandescent lamps 102. This would also obviate the need for the DC-DC converter circuit 105 thereby simplifying the circuit somewhat and reducing its cost. As illustrated in FIGURE 7B, the output of the battery 109 would be connected directly through the terminals $\mathbf{106_a}$ and $\mathbf{106_b}$ to the corresponding input terminals of the power supply 89 as shown in FIGURE 6A. Since the power supply arrangements of FIGURES 7A and 7B do not affect in a substantial manner the operation of the wide range pulse modulated control system data link transmitter, its operation will be as described with relation to FIGURES 6A and 6B.

It might also be noted, that in addition to the current transformer 94 employed to sense the value of the line current flowing in the conductor 85, it would be possible to employ other types of sensors to derive this control signal with the arrangement of FIGURES 7A and 7B. Such other types of control signal sensors would be, for example, Hall crystals, or magneto-resistive sensing elements which are capable of deriving output signals proportional to the value of a magnetic field by which they are influenced. In the case of Hall crystals, these devices tend to exhibit a piezo-electric effect wherein they develop an output potential proportional to the strength of the magnetic field to which they are subjected. In the case of the magneto-resistive material sensors, these devices exhibit a resistance to the flow of electric current proportional to the strength of the magnetic field to which they are subjected. These latter devices would require an external power supply source, and could be energized from a power supply arrangement such as shown in FIGURES 7A and 7B. Neither the Hall crystal or the magneto-resistive sensor would obviate the need for one of the power supply arrangements depicted in FIGURE 6 or FIGURE 7, however.

Figure 8:
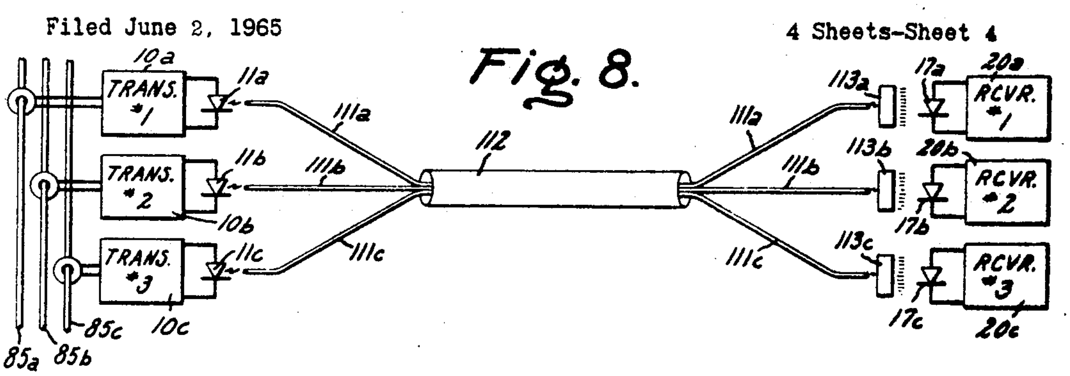
FIGURE 8 is a functional block diagram of a current sensing arrangement for a three phase power line constructed in accordance with the invention.

FIGURE 8 of the drawings is a functional block diagram of a current sensing arrangement for a three phase power line constructed in accordance with the invention. The three phase power line is depicted by the three conductors $\mathbf{85_a}$, $\mathbf{85_b}$, and $\mathbf{85_c}$ having current sensing transformer cores surrounding each one of the conductors for deriving therefrom a signal proportional to the value of the curent flowing in each conductor. For convenience, the power supply current transformer (or alternatively, a solar cell array) has been omitted in oder to simplify the illustation. It is understood, of course, that one of the power supply arrangements such as described in connection with FIGURE 6A or FIGURES 7A or 7B would be required for each of the transmitters $\mathbf{10_a}$, $\mathbf{10_b}$, or $\mathbf{10_c}$. Each of the transmitters $\mathbf{10_a}$ through $\mathbf{10_c}$ is identical in construction and operation to the transmitter described with relation to FIGURE 2 of the drawings, and serves to power a respective associated light emitting diode $\mathbf{11_a}$, $\mathbf{11_b}$, or $\mathbf{11_c}$. It should be noted, however, that each of the light emitting diodes $\mathbf{11_a}$ through $\mathbf{11_c}$ is not identical to the other in that each diode is designed to emit light from only a characteristic portion of the spectrum different from that emitted by any other diode. This characteristic of light emitting diodes was described previously in connection with FIGURE 2 of the drawings, and greatly facilitates the use of these devices in multiple channel data links as shown in FIGURE 8 without substantial cross channel interference. However, in order to minimize further the possibility of cross channel interference, it is desirable that the light emitted by the respective light emitting diodes $\mathbf{11_a}$ through $\mathbf{11_c}$ be transmitted over fiber optic coupling elements or rods $\mathbf{111_a}$ through $\mathbf{111_c}$. The output ends of the fiber optic rods, $\mathbf{111_a}$ through $\mathbf{111_c}$ are coupled to the electro optic receiver elements $\mathbf{17_a}$ through $\mathbf{17_c}$, respectively, of the associated receivers $\mathbf{20_a}$ through $\mathbf{20_c}$. The receivers $\mathbf{20_a}$ through $\mathbf{20_c}$ are identical in construction and operation to the receiver described in relation to FIGURE 4 of the drawings, and hence will not be described further. It is desirable, however, that the electro-optical receiver devices $\mathbf{17_a}$ through $\mathbf{17_c}$ used in the receivers, be designed in such a manner that their response characteristics match the emission characteristics of the light emitting diodes $\mathbf{11_a}$ through $\mathbf{11_c}$, respectively, with which they are associated. By proper design, no further filtering would be necessary; however, if a high fidelity transmission system is desired, then optical filter elements shown at $\mathbf{113_a}$ through $\mathbf{113_c}$ may be interposed between the fiber optic coupling elements $\mathbf{111_a}$ through $\mathbf{111_c}$ and their respective associated electro-optical receiver devices $\mathbf{17_a}$ through $\mathbf{17_c}$. The optical filter elements $\mathbf{113_a}$ through $\mathbf{113_b}$ may comprise any conventional optical filter element such as those manufactured and sold by the Baird Atomic Corporation of Cambridge, Mass., and are designed to provide a sharp cut-off of the light transmitted therethrough which falls outside a predesigned band pass characteristic that is designed to be identical to the band of frequencies emitted by the light emitting diode with which they are associated. In this manner, a high fidelity control system data transmission link having multiple channels can be provided.

From the foregoing description, it can be appreciated that there are several inherent advantages of the present wide range control system data link using pulse modulated light emitted by a light emitting semiconductor device. A few of the more important advantages of this system are its very fast response time due to the quick rise and fall of the light emitting diode light source as measured in a fraction of a microsecond range. It has long life and mechanical ruggedness leading to greatly improved reliability. The low impedance of the light emitting diode is compatible with low voltage, low current power supply and other semiconductor circuits, and its forward characteristic is similar to the ordinary silicon power diode. Due to the fact that virtually all of the light output from the light emitting diode is contained in a characteristic relatively narrow bandwidth, they can be readily used in multi-channel systems, and can be easily adapted to employ optical filtering if and when it is needed to reduce cross-channel interference effects and the like. Two important characteristics of the light emitting diode; namely, its low impedance and fast response, make it particularly suitable for battery-powered standby applications such as that described with relation to FIGURES 6 and 7. The pulse repetition rate modulated light coupling technique employed in the system overcomes inaccuracies due to factors affecting the optical transmission path such as dirt, smoke, mis-alignment, etc., and hence it provides an extremely reliable, highly accurate means for relaying information from one locale to another.

It can be appreciated therefore that the present invention provides a new and improved wide range remote control system data link using pulse modulated light coupling. By reason of its design and use of a light emitting diode, the data link is fast responding, reliable in operation, relatively inexpensive to fabricate, and requires only very small average power drain in operation.

Having described several embodiments of a new and improved wide range control system data link employing pulse modulated light coupling and constructed in accordance with the invention, it is believed obvious that other modifications and variations of the invention are possible in light of the above teachings. It is therefore to be understood that changes may be made in the particular embodiments of the invention described.

What we claim as new and desire to secure by Letters Patent of the United States is:

1. A new and improved wide range remote control data link for instrumentation and control applications including in combination, control signal developing means for deriving an analog variable magnitude direct current electric control signal indicative of the phenomenon to be measured or controlled, a light transmitter controlled by said signal developing means comprising analog to frequency conversion means coupled to said control signal developing means for deriving a variable repetition rate pulsed electric signal whose repetition rate variations correspond to the magnitude variations of the analog control signal, and a non-coherent light emitting semiconductor device that is operated at ambient temperatures and is operatively coupled to the analog to frequency conversion means for deriving a series of light pulses whose repetition rate corresponds to the repetition rate of the pulsed electric signal developed by the analog to frequency conversion means, and a receiver remotely located at relatively short range from the transmitter and comprising a light activated semiconductor receiver device optically coupled to the non-coherent light emitting semiconductor device for reconverting the varying repetition rate light pulses to a varying repetition rate pulsed electric signal, and means coupled to said light activated semiconductor receiver device for deriving an indication of the phennomenon being examined from the varying repetition rate pulsed electric signal.

2. A transmitter for a wide frequency range control system data link using light coupling employed at relatively short ranges for instrumentation and control applications including in combination input circuit means for developing an analog variable magnitude direct current electric control signal representative of a phenomenon to be measured or controlled, a variable frequency relaxation oscillator operatively coupled to and controlled by the input circuit means for deriving a varying repetition rate pulsed gating signal representative of the intelligence contained in the analog control signal, pulse generator circuit means operatively coupled to and controlled by said relaxation oscillator for amplifying and shaping the varying repetition rate gating signal pulses, and a non-coherent light emitting semiconductor diode that is operated at ambient temperatures and is operatively coupled to the pulse generator circuit means for converting the varying frequency gating signal pulses to light pulses having a varying repetition rate, wherein said pulse generator circuit means comprises a pulsing capacitor, an inductor, and a gate controlled thyristor semiconductor device connected in a closed series circuit loop with the non-coherent light emitting diode, the control gate of the gate controlled thyristor device being operatively coupled to the output of the variable frequency relaxation oscillator, and recharging circuit means coupled to the pulsing capacitor for charging the pulsing capacitor during nonconducting intervals of the gate controlled thyristor device.

3. The combination as set forth in claim 2 further characterized by means for coupling a turn-off potential to the relaxation oscillator following each conducting interval of a unijunction transistor forming a part thereof, to thereby assure its complete turn-off.

4. A new and improved wide frequency range remote control system data link using light coupling including in combination input circuit means for developing an analog variable magnitude direct current electric control signal representative of a phenomenon to be measured or controlled, a variable frequency relaxation oscillator operatively coupled to and controlled by the input circuit means for deriving a varying repetition rate pulsed electric gating signal representative of the intelligence contained in the analog control signal, pulse generator circuit means operatively coupled to and controlled by said relaxation oscillator for amplifying and shaping the varying repetition rate gating signal pulses, a non-coherent light emitting diode that is operated at ambient temperatures and is operatively coupled to the pulse generator circuit means for converting the varying repetition rate gating signal pulses to light pulses having a varying repetition rate, a light activated semiconductor receiver device positioned at relatively short range to have the light pulses produced by said light emitting diode impinge thereon at a varying repetition rate, preamplifier circuit means operatively coupled to the light activated semiconductor receiver device for amplifying the varying repetition rate electric signal pulses produced thereby, monostable multivibrator circuit means operatively coupled to the preamplifier circuit means for further amplifying and shaping the varying repetition rate electric signal pulses, and output circuit means operatively coupled to the monostable multivibrator circuit means for providing an output indication of the phenomenon to be measured or controlled.

5. The combination set forth in claim 4 wherein the pulse generator circuit means comprises a pulsing capacitor, an inductor, and a gate controlled thyristor semiconductor device connected in closed series circuit loop with the light emitting diode, the control gate of the gate controlled thyristor device being operatively coupled to the output of the variable frequency relaxation oscillator, and recharging circuit means coupled to the pulsing capacitor for charging the pulsing capacitor during nonconducting intervals of the gate controlled thyristor device, and wherein the combination is further characterized by means for coupling a turn-off potential from the pulsing capacitor to the relaxation oscillator following each conducting interval to facilitate its operation, and wherein said light-activated semiconductor device is further characterized by a steady state light source positioned adjacent to the light activated semiconductor device for providing the same with a bias illumination to bias the device to an optimum operating point.

6. A data transmission system comprised by a plurality of wide range data link channels with each channel being constructed as set forth in claim 1 and deriving a different and independent control signal indicative of the phenomenon being measured or controlled, and wherein the non-coherent light emitting semiconductor device associated with each individual data link channel emits light over a characteristic portion of the spectrum different from that emitted by the other light emitting diodes in the system, and the light activated semiconductor receiver device optically coupled with each respective one of the light emitting semiconductor devices is responsive only to light rays lying within the characteristic portion of the spectrum emitted by its respective associated light emitting semiconductor device.

7. The combination set forth in claim 6 further characterized by a separate fibre optic light path intercoupling each light emitting semiconductor device and its respective associated light activated semiconductor receiver device.

8. The combination set forth in claim 6 further characterized by an optical filter interposed between each light-emitting semiconductor device and its respective associated light activated semiconductor receiver device for enhancing the frequency selective characteristics of the system.

9. The combination set forth in claim 6 further characterized by a separate fibre optic light path intercoupling each light emitting semiconductor device and its respective associated light activated semiconductor receiver device and an optical filter which selectively passes only the characteristic portion of the spectrum of interest interposed between each fibre optic light path and its respective associated light activated semiconductor receiver device.

10. A current monitor for an electric power conductor including in combination, control signal developing means for deriving an analog variable magnitude direct current electric control signal indicative of the current flowing in a power conductor, a light transmitter controlled by said signal developing means comprising analog to frequency conversion means coupled to said control signal developing means for deriving a variable repetition rate pulsed electric signal whose repetition rate variations correspond to the magnitude variations of the analog control signal, and a non-coherent light emitting semiconductor device that is operated at ambient temperatures and is operatively coupled to the analog to frequency conversion means for deriving a series of light pulses whose repetition rate corresponds to the repetition rate of the pulsed electric signal developed by the analog to frequency conversion means, and a receiver remotely located at relatively short range from the transmitter and comprising a light activated semiconductor receiver device optically coupled to the non-coherent light emitting semiconductor device for reconverting the varying repetition rate light pulses to a varying repetition rate pulsed electric signal, and means coupled to said light activated semiconductor receiver device for deriving an indication of the value of the current flowing in the power conductor from the varying repetition rate pulsed electric signal, and a low level power supply for energizing the transmitter comprising an array of solar cells physically located adjacent the transmitter for deriving a low level electric power output, circuit means having its input electrically coupled to the array of solar cells for converting the low level electric power derived by the solar cell array to a desired voltage level and having its output electrically coupled to and energizing the transmitter, and radiant energy illuminating means remotely positioned from the solar array and coupled thereto by a radiant energy coupling path for illuminating the solar array.

References Cited

UNITED STATES PATENTS

| | | | |
|---|---|---|---|
| 2,689,949 | 9/1954 | Kalbach et al. | 250—199 |
| 3,083,299 | 3/1963 | Cruse. | |
| 3,087,065 | 4/1963 | Mutschler | 250—199 |
| 3,110,813 | 11/1963 | Sack | 250—199 X |
| 3,157,843 | 11/1964 | Koncen. | |
| 3,346,811 | 10/1967 | Perry et al. | 324—96 |
| 3,258,596 | 6/1966 | Green | 250—199 |
| 3,029,353 | 4/1962 | Gold et al. | 307—311 X |
| 3,192,387 | 6/1965 | Goodman | 250—239 X |

OTHER REFERENCES

Perry: "Laser System Monitors EHV Current"; Electrical World (TK 1.E6), vol. 162, Nov. 30, 1964; pp. 72 and 73.

"Laser Offers Lower-Cost EHP Current Monitoring"; Electrical World (TK 1.E6), vol. 162, p. 147; Nov. 16, 1964.

Johnson: Electronics, Dec. 13, 1963; vol. 36, pp. 34–39.

Moulton, C. H.: Electronics; May 17, 1965, pp. 71–76.

RUDOLPH V. ROLINEC, Primary Examiner

C. F. ROBERTS, Assistant Examiner

U.S. Cl. X.R.

250—199, 214; 307—311